(12) United States Patent
Albl et al.

(10) Patent No.: US 10,544,835 B2
(45) Date of Patent: Jan. 28, 2020

(54) WHEEL BEARING ASSEMBLY FOR A MOTOR VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/822,957

(22) Filed: Nov. 27, 2017

(65) Prior Publication Data

US 2018/0156278 A1 Jun. 7, 2018

(30) Foreign Application Priority Data

Dec. 1, 2016 (DE) .......................... 10 2016 223 910

(51) Int. Cl.
| | | |
|---|---|---|
| *F16C 33/80* | (2006.01) | |
| *F16C 41/00* | (2006.01) | |
| *B60B 27/00* | (2006.01) | |
| *F16J 15/326* | (2016.01) | |
| *F16C 33/78* | (2006.01) | |
| *F16C 19/18* | (2006.01) | |

(52) U.S. Cl.
CPC .......... *F16C 33/805* (2013.01); *F16C 41/007* (2013.01); *F16J 15/326* (2013.01); *B60B 27/0068* (2013.01); *B60B 27/0073* (2013.01); *F16C 19/184* (2013.01); *F16C 33/7883* (2013.01); *F16C 2326/02* (2013.01)

(58) Field of Classification Search
CPC .... F16C 41/00; F16C 41/007; F16C 33/7883; F16C 33/805; F16C 19/184; B60B 27/0068; B60B 27/0073; B60B 27/02; F16J 15/326
See application file for complete search history.

(56) References Cited

U.S. PATENT DOCUMENTS

| | | | | |
|---|---|---|---|---|
| 5,080,500 A | * | 1/1992 | Hilby | ..................... G01P 3/443 310/168 |
| 5,127,747 A | * | 7/1992 | Hilby | ..................... G01P 3/443 310/168 |
| 5,195,830 A | * | 3/1993 | Caillault | ............. F16C 33/7879 384/448 |
| 5,293,124 A | * | 3/1994 | Caillaut | ................ F16C 19/184 324/173 |
| 5,438,260 A | * | 8/1995 | Rigaux | ................... G01P 3/443 324/166 |

(Continued)

FOREIGN PATENT DOCUMENTS

| | | |
|---|---|---|
| DE | 758595 A | 3/1953 |
| DE | 102004044118 A1 | 3/2006 |

(Continued)

OTHER PUBLICATIONS

Machine Translation of JP-2009293651-A (Year: 2009).*

(Continued)

*Primary Examiner* — Alan B Waits
(74) *Attorney, Agent, or Firm* — Maier & Maier, PLLC

(57) ABSTRACT

A wheel bearing assembly for a motor vehicle. A roller bearing arranged in a wheel carrier, by which a wheel hub is rotatably mounted with respect to the wheel carrier. The wheel carrier is provided with a circumferential axial gap, and that at the rotary bearing ring of the roller bearing is formed an extension which is extending into the gap.

5 Claims, 2 Drawing Sheets

(56) References Cited

U.S. PATENT DOCUMENTS

| | | | | |
|---|---|---|---|---|
| 5,468,072 A | * | 11/1995 | Ekdahl | B61C 3/00 384/446 |
| 5,678,933 A | * | 10/1997 | Ouchi | G01P 3/443 384/448 |
| 5,695,289 A | * | 12/1997 | Ouchi | F16C 19/185 324/174 |
| 6,231,241 B1 | * | 5/2001 | Ohkuma | F16C 35/06 324/173 |
| 7,632,020 B2 | * | 12/2009 | Niebling | F16C 33/7886 384/448 |
| 8,007,179 B2 | * | 8/2011 | Heim | B60B 27/00 384/448 |
| 2003/0093188 A1 | * | 5/2003 | Morita | B60C 23/0408 701/1 |
| 2009/0046970 A1 | * | 2/2009 | Kawamura | B60B 27/0005 384/544 |
| 2011/0221142 A1 | * | 9/2011 | Wang | F16C 33/805 227/549 |
| 2012/0200145 A1 | * | 8/2012 | Kakuda | B60B 3/001 301/109 |
| 2012/0281939 A1 | * | 11/2012 | Nakamura | B60B 27/0005 384/477 |
| 2013/0069332 A1 | * | 3/2013 | Wang | B60B 27/0005 280/124.1 |
| 2013/0121629 A1 | * | 5/2013 | Takada | G01P 1/026 384/448 |
| 2016/0061268 A1 | * | 3/2016 | Ohira | F16C 33/78 384/448 |
| 2016/0186861 A1 | * | 6/2016 | Kimura | F16J 15/002 277/349 |
| 2016/0216168 A1 | * | 7/2016 | Itomi | B62D 6/10 |

FOREIGN PATENT DOCUMENTS

| | | | | |
|---|---|---|---|---|
| DE | 102012216598 A1 | | 3/2014 | |
| DE | 102015002965 | * | 3/2016 | |
| DE | 102015002965 B3 | | 3/2016 | |
| DE | 102015122519 A1 | | 6/2016 | |
| JP | H09166136 | * | 6/1997 | |
| JP | 2002327769 A | | 11/2002 | |
| JP | 2003120704 A | * | 4/2003 | F16C 33/7879 |
| JP | 2009174705 A | * | 8/2009 | F16C 41/007 |
| JP | 2009293651 A | * | 12/2009 | F16C 33/723 |
| JP | 2015137754 A | | 7/2015 | |
| JP | 201617579 A | | 2/2016 | |
| WO | 2013120541 A1 | | 8/2013 | |

OTHER PUBLICATIONS

Search Report dated Jul. 7, 2017 of corresponding German application No. 102016223910.4; 12 pgs.

European Extended Search Report dated Jan. 25, 2018 of corresponding European application No. 17200393.1; 8 pgs.

* cited by examiner

WHEEL BEARING ASSEMBLY FOR A MOTOR VEHICLE

FIELD

The invention relates to a wheel bearing assembly for a motor vehicle.

BACKGROUND

Wheel bearing assemblies for a motor vehicle having a rotary, signal generating encoder, which are cooperating with the encoder and are equipped with a fixed speed sensor for measuring the rotational speed or the rotational angle of the mounted wheel, are well known from prior art. Reference is hereby made merely by way of an example to DE 10 2012 216 598 A1 and to WO 2013/120541 A1.

SUMMARY

The objective of the invention is to further develop a wheel bearing assembly for a motor vehicle and to arrange it in such a way, that a roller bearing arranged in a wheel is provided with a wheel hub that can be rotatably mounted with respect to the wheel carrier so that it is better protected from water and dirt penetration.

The wheel bearing assembly for a motor vehicle comprises a roller bearing arranged in a wheel carrier in a known manner by means of which a wheel hub is rotatably mounted with respect to the wheel carrier.

According to the invention, a circumferential axial gap is formed axially opposite to the roller bearing on the wheel carrier, and an extension is arranged or formed on the rotating bearing ring of the roller bearing, which extends into the gap that is formed in the wheel carrier.

The embodiment according to the invention proves to be particularly advantageous because by using the extension in combination with the gap, a labyrinth is built in this manner, which then assumes the pre-sealing function with respect to the roller bearing and which renders access of water and dirt to the roller bearing more difficult, so that the roller bearing is better protected against penetration of water and dirt.

In this case it is preferred when the circumferential gap is formed in the wheel carrier in the form of a groove that is introduced into the wheel carrier. As a result, the gap can be advantageously produced in a simple manner as well as quickly.

According to a particularly preferred embodiment of the invention, the wheel bearing assembly further comprises a fixed rotational speed sensor and a signal generating encoder, which cooperates with the rotational sensor and which is arranged opposite the rotational speed sensor. As a result, the rotational speed sensor is designed and arranged in such a way that a front face extends into the gap, which is to say that a front surface of the encoder extending into the gap forms in this area the bottom of the gap and in addition, the encoder is arranged on the extension that is extending into the gap. This embodiment proves to be particularly advantageous because in this case, in addition to the pre-sealing that is formed by the extension in combination with the gap and in addition to the resulting improved protection of the roller bearing against water and dirt penetration, a protected arrangement of the rotational speed sensor and of the encoder is in particular also guaranteed.

It is in this case preferred when the extension that is reaching into the gap is an axially projecting shoulder of a centrifugal disk arranged on the rotary bearing ring of the roller bearing, which is in particular preferably provided with a component in the form of a cassette seal which has at least one sealing lip and which is active between the bearing rings of the roller bearing.

The positive effect of this embodiment is that as a result of combining the extension with the gap, a pre-sealing is provided for the cassette sealing of the roller bearing. As a result, the cassette sealing is less exposed to penetration of water and dirt, so that less wear and tear occurs on the sealing lips of the cassette sealing and a longer service life of the cassette sealing is ensured.

It is preferred when a rotational speed sensor that is cooperating with the encoder is arranged in a bore of the wheel carrier. The effect of the arrangement of the rotational speed sensor in a bore of the wheel carrier is that a simple assembly or exchange of the rotational speed sensor is thus enabled.

According to another preferred embodiment of the invention, a drain hole leading to the gap is introduced in the wheel carrier. In this manner it is ensured in an advantageous manner that water, which is collected by the effect of centrifugal force between the wheel carrier and the extension, can escape again through the drain hole in a targeted manner.

BRIEF DESCRIPTION OF THE DRAWING

Further advantages and application possibilities of the present invention will become apparent from the description below in conjunction with the embodiment shown in the drawing.

DETAILED DESCRIPTION OF THE DRAWING

Figure 1:
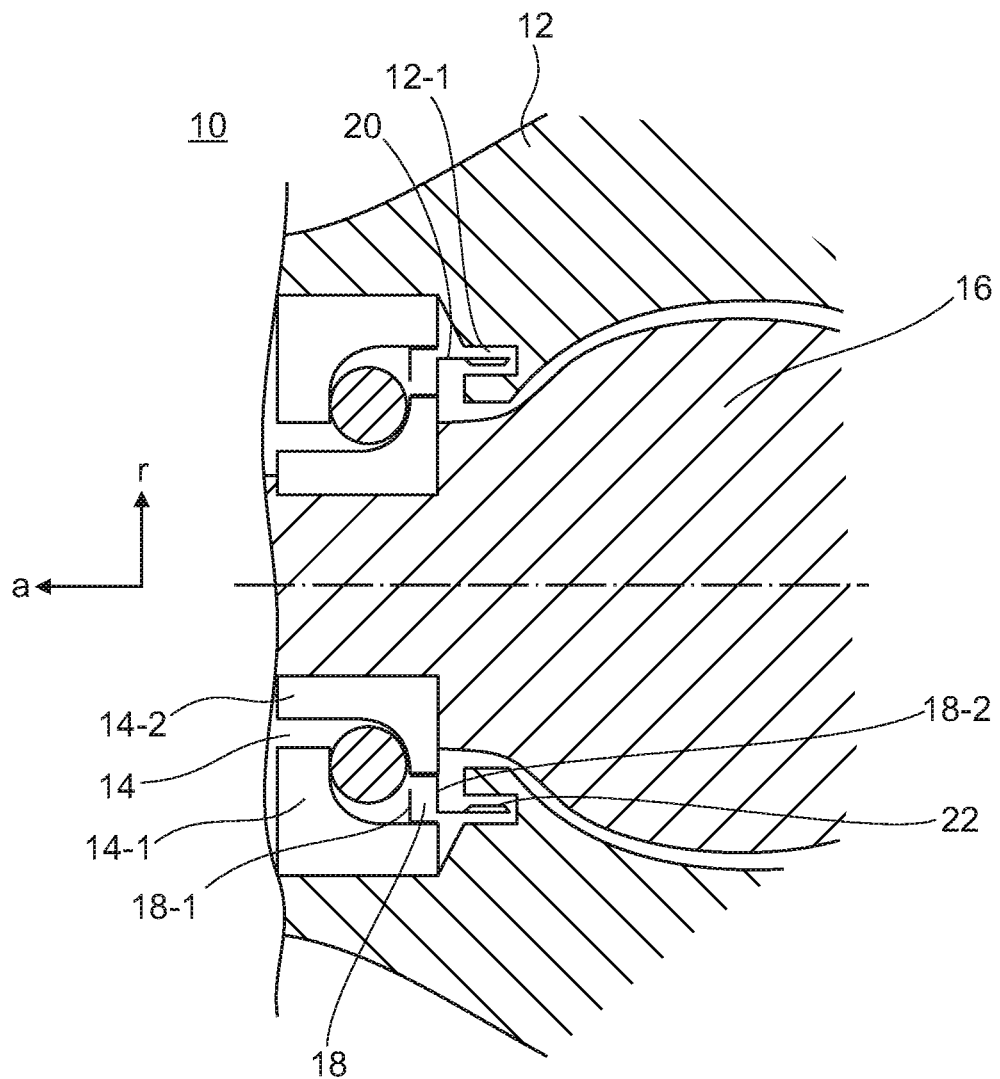
FIG. 1 is a schematic, partial and sectional view of a wheel bearing assembly according to the invention.
Figure 2:
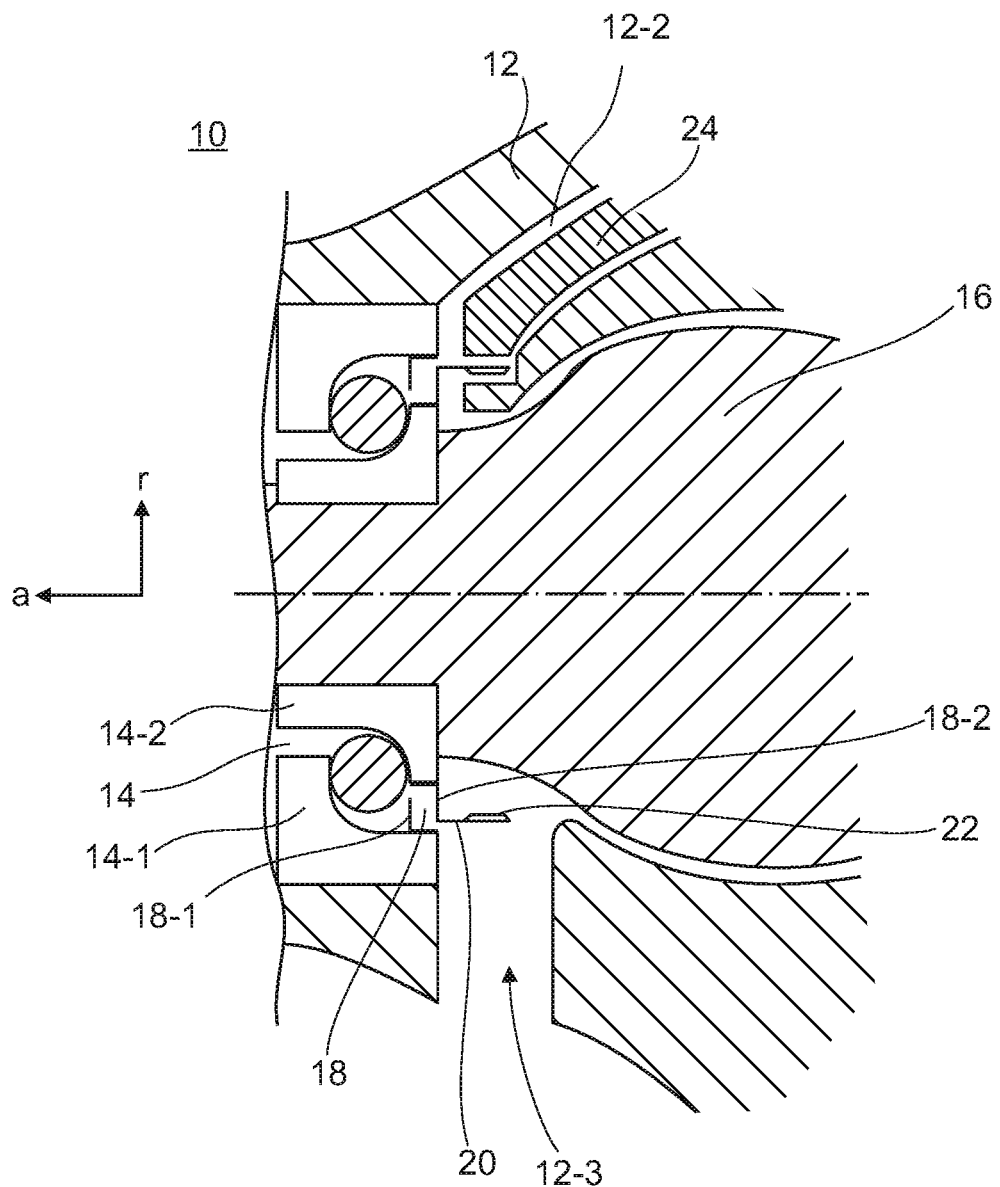
FIG. 2 shows the wheel assembly of FIG. 1 in another sectional view illustration.

FIG. 1 and FIG. 2 show a wheel bearing assembly generally designated by the number 10. The wheel bearing assembly comprises in a known manner a roller bearing 14 mounted in a wheel carrier 12, by means of which a wheel hub—not shown here—is mounted rotatably with respect to the wheel carrier 12.

While the fixed bearing outer ring 14-1 is mounted in the wheel carrier 12, the rotary inner ring 14-2 is seated on a joint shaft 16, which is in turn non-rotatably connected to the wheel hub, not shown.

As can be further seen in FIG. 1 and FIG. 2, the roller bearing 14 is sealed on the side of the wheel carrier by means of a sealing arrangement 18. The sealing arrangement 18 is provided in the present case in the form of a cassette sealing and it comprises a sealing element 18-1 arranged on a stationary bearing outer ring 14-1 as well as a sealing element 18-2 arranged on a rotary bearing inner ring 14-2, between which are in a known manner arranged sealing lips, not shown here.

As FIG. 1 further also shows, the wheel carrier 12 is provided with a circumferential gap 12-1 located axially opposite the roller bearing 14. The gap 12-1 is in the present case designed in the form of a circumferential grove introduced into a circumferential groove created in the wheel carrier 12. In addition, as is also further shown in FIG. 1, in the second sealing element 18-2 is created in the form of a centrifugal disk an extension 20, which is aligned in the axial direction and extending into the gap 12-1.

A labyrinth is formed in an advantageous manner by means of the gap 12-1 in the wheel carrier 12 in combination with the extension 20, which is extending into the gap 12-1 and which assumes the pre-sealing function with respect to the cassette sealing 18 and thus also with respect to the roller bearing 2, so that as a result of the reduced penetration of water and dirt to the cassette sealing 18, the wear and tear of the sealing lip is reduced and the roller bearing 14 is better protected against penetration of water and dirt.

In addition, the wheel bearing assembly 10 further comprises also a rotary, signal generating encoder 22, as well as a fixed rotation speed sensor 23, which cooperates with the encoder 22. In this case, as shown in FIG. 1 and FIG. 2, the encoder 22 is arranged at the extension 20 which is extending into the gaps 12-1, while the rotational speed sensor 24 is arranged in a bore 12-2 of the wheel carrier 12 which is extending into the gap 12-1, see FIG. 2, so that a front surface of the rotary speed sensor 24 extending into the gap 12-1 is arranged radially opposite the encoder 22.

In order to remove in a targeted manner water that is formed by the centrifugal force between the wheel carrier 12 and the extension 20, a drain bore 12-3 extending into the gap 12-1 is created in the wheel carrier 12, in addition to the bore 12-1 which accommodates the rotational speed sensor 24 on the radially opposite side, see FIG. 2.

The invention claimed is:

1. A wheel bearing assembly for a motor vehicle, comprising:
- a roller bearing arranged in a wheel carrier, the roller bearing includes a rotary bearing ring and a fixed bearing ring, a wheel hub is mounted rotatably with respect to the wheel carrier, the wheel carrier is provided with a circumferential radial gap formed axially opposite to the roller bearing on the wheel carrier and at the rotary bearing ring of the roller bearing is formed an extension which is extending into the gap in a direction axially away from the roller bearing along an axis parallel to a joint shaft axis,
- wherein the circumferential gap is a groove introduced into the wheel carrier,
- wherein the rotary bearing ring is seated on a joint shaft which is rotated within the wheel carrier,
- wherein the fixed bearing ring is mounted in the wheel carrier; and
- wherein the wheel carrier further comprises a drain hole defining a passage extending between an external surface of the wheel carrier and the extension, wherein said drain hole axially overlaps the extension.

2. The wheel bearing assembly according to claim 1, wherein the wheel bearing assembly further comprises a fixed rotational speed sensor and a rotating and signal generating encoder, which is arranged opposite the rotational speed sensor, wherein the rotational speed sensor is arranged so that it extends inside the gap, and wherein the encoder is arranged on the extension which is extending into the gap.

3. The wheel bearing assembly according to claim 1, wherein the extension is an axially projecting extension of a centrifugal disk arranged on the rotary bearing ring of the roller bearing.

4. The wheel bearing assembly according to claim 3, wherein the centrifugal disk is a component part of a cassette seal, which is effective between the rotary ring and the fixed bearing ring of the roller bearing.

5. The wheel bearing assembly according to claim 1, wherein the rotational speed sensor is arranged in a bore of the wheel carrier.

* * * * *